USUS009216622B1

(12) United States Patent
Drozdowski et al.

(10) Patent No.: US 9,216,622 B1
(45) Date of Patent: Dec. 22, 2015

(54) FACING ASSEMBLY FOR VEHICLE INCLUDING TOWING CABLE GUIDE

(71) Applicant: FORD GLOBAL TECHNOLOGIES, LLC, Dearborn, MI (US)

(72) Inventors: James Adam Drozdowski, Canton, MI (US); Jay Robert Degenkolb, Rockwood, MI (US); Mark Mikolaiczik, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/512,851

(22) Filed: Oct. 13, 2014

(51) Int. Cl.
| B60D 1/00 | (2006.01) |
| B60D 1/18 | (2006.01) |
| B62D 35/00 | (2006.01) |
| B60R 19/02 | (2006.01) |
| B60R 19/44 | (2006.01) |

(52) U.S. Cl.
CPC . *B60D 1/18* (2013.01); *B60R 19/02* (2013.01); *B60R 19/44* (2013.01); *B62D 35/00* (2013.01)

(58) Field of Classification Search
CPC .......... B60D 1/18; B60R 19/02; B60R 19/44; B62D 35/00

USPC .......... 296/187.09, 180.1; 293/112, 118, 119, 293/120, 15, 38, 102
See application file for complete search history.

(56) References Cited

U.S. PATENT DOCUMENTS

| 4,247,585 | A | * | 1/1981 | Hulten | 428/31 |
| 6,176,530 | B1 | | 1/2001 | Gollungberg | |
| 6,460,909 | B2 | * | 10/2002 | Mansoor et al. | 293/120 |
| 6,997,490 | B2 | | 2/2006 | Evans et al. | |
| 2009/0072557 | A1 | | 3/2009 | Roddy et al. | |
| 2013/0093210 | A1 | | 4/2013 | Johnson | |

* cited by examiner

*Primary Examiner* — Joseph D Pape
(74) *Attorney, Agent, or Firm* — Jason Rogers; King & Schickli, PLLC

(57) ABSTRACT

A facing assembly is provided for a motor vehicle. That facing assembly includes a resilient facing member and a resilient reinforcing element. The resilient reinforcing element engages and supports the resilient facing member against wind forces experienced during vehicle operation so as to provide desired aerodynamics at speed while allowing the necessary flex when contacted by an obstruction to provide clearance and the necessary resiliency to return to the home position once clear of the obstruction. Further, the resilient reinforcing element includes a channel that receives, holds and guides a towing or wench cable and protects the resilient facing member during the towing or wenching operation.

13 Claims, 4 Drawing Sheets

FACING ASSEMBLY FOR VEHICLE INCLUDING TOWING CABLE GUIDE

TECHNICAL FIELD

This document relates generally to the motor vehicle field and, more particularly, to a facing assembly for a motor vehicle including a resilient facing member and a resilient reinforcing element equipped with a towing cable guide.

BACKGROUND

Various front fascia, valence panels and air dams have been developed to provide motor vehicles with increased aerodynamics, greater stability at speed and increased fuel economy. These facing assemblies are made from materials having sufficient rigidity to maintain their aerodynamic shape when subjected to wind loads associated with high-speed driving.

In order to provide the desired aerodynamics, stability and increased fuel economy, it should be appreciated that the facing assemblies must extend downwardly to a relatively short distance from the roadway in order to help reduce the amount of air passing under the vehicle. As a consequence, the facing assemblies project down to a height where they are prone to contact with curbing and steep pitched driveway ramps. When a facing assembly made with relatively rigid material contacts such structures, there is a tendency for the facing assembly to be damaged.

This document relates to a new and improved facing assembly wherein the resilient facing member of the assembly is made from a less rigid and more resilient material that is better capable of flexing when contacting an obstruction and thereby avoiding potential damage. Further, this document relates to a facing assembly incorporating a resilient reinforcing element that reinforces the facing member so as to hold it in a desired aerodynamic position against wind forces when traveling a speed. Further, the reinforcing element includes an integral towing cable guide that protects the resilient facing member from damage from the towing cable or chain that may, for example, be used when positioning a disabled vehicle on an inclined flatbed of a tow truck.

SUMMARY

In accordance with the purposes and benefits described herein, a facing assembly is provided for a motor vehicle. That facing assembly comprises a resilient facing member and a resilient reinforcing element that engages and supports the resilient facing member. More specifically, the facing member is supported by the reinforcing element in a home position against wind forces experienced during vehicle operation so as to provide desired aerodynamics at speed. In addition, the facing member and the reinforcing element flex when contacted by an obstruction, such as a curb, driveway ramp or the like, to provide clearance and prevent or minimize damage from such contact and then spring back into the home position once clear of the obstruction.

In one possible embodiment the resilient facing member is a front fascia. In another possible embodiment the resilient facing member is a valence panel. In yet another possible embodiment the resilient facing member is an air dam.

In one possible embodiment the resilient reinforcing element includes a mounting base section and a depending support section. Such a resilient reinforcing element may be formed from a substantially continuous spring steel wire. Further, the resilient reinforcing element may include a first arm and a second arm depending from the mounting base section and a cross member section connecting the first and second arms. The cross member includes a channel. When the vehicle is being towed, that channel receives, holds and guides the towing cable and functions to protect the resilient facing member from damage caused by the towing cable during towing.

Still further, the facing assembly may include at least one mounting bracket for securing the mounting base section to a frame member of the motor vehicle. That frame member may be a cross member upon which a front bumper is mounted or the front bumper itself.

In any possible embodiment, the resilient reinforcing element may include the channel to receive and guide the tow cable. That channel is provided in the resilient reinforcing element adjacent to and immediately behind a lowermost edge of the resilient facing member. In this position the channel functions to protect the facing member from damage from the tow cable while remaining substantially out of view.

In accordance with an additional aspect, a method is provided for reinforcing a resilient facing member for a motor vehicle. That method comprises engaging and supporting the resilient facing member with a resilient reinforcing element whereby the facing member is supported in a home position against wind forces experienced during vehicle operation so as to provide desired aerodynamics at speed while the facing member and reinforcing element flex when contacted by an obstruction to provide clearance and then spring back into the home position once clear of the obstruction. Still further the method includes providing a channel in the reinforcing element to receive, hold and guide a towing cable and protect the resilient facing member from damage caused by the towing cable during towing.

In the following description, there is shown and described several preferred embodiments of the facing assembly. As it should be realized, the facing assembly is capable of other, different embodiments and its several details are capable of modification in various, obvious aspects all without departing from the facing assembly as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the facing assembly and together with the description serve to explain certain principles thereof. In the drawing figures.

Figure 1:
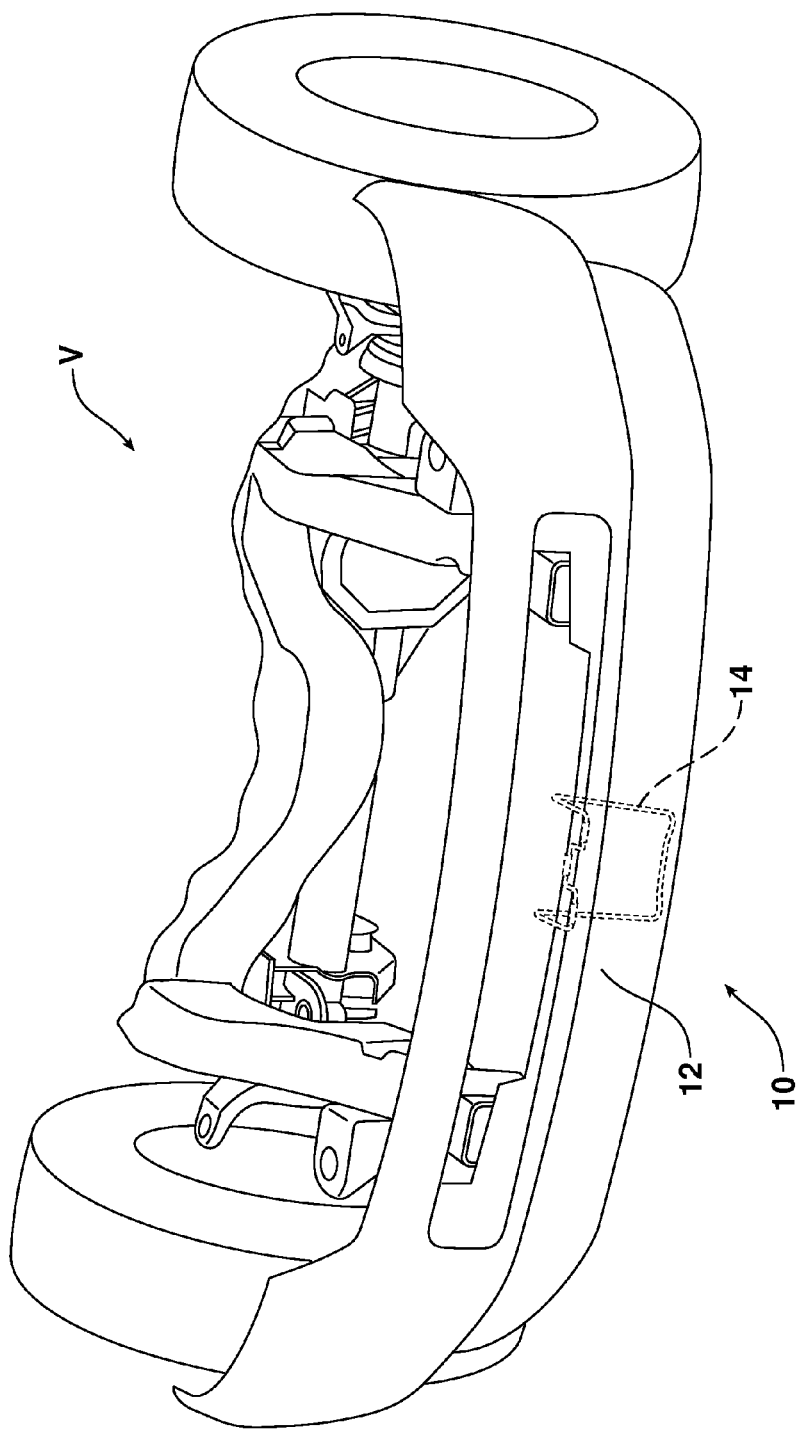
FIG. 1 is a perspective view of the facing assembly secured to the frame or front bumper of the motor vehicle.

Reference will now be made in detail to the present preferred embodiment of the facing assembly, examples of which are illustrated in the accompanying drawing figures.

DETAILED DESCRIPTION

Reference is now made to FIGS. 1, 2, 3a and 3b illustrating a facing assembly 10 which includes a resilient facing member 12 and a resilient reinforcing element 14 that engages and supports the resilient facing member. The resilient facing member 12 may comprise a front fascia, a valence panel, an air dam or the like. The resilient facing member 12 is designed to limit airflow underneath the vehicle V to which it is attached and thereby provide improved aerodynamics, enhanced stability and increased fuel economy. In one possible embodiment, the resilient facing member 12 is manufactured from a polymer composite material which may or may not include reinforcing fibers and natural or synthetic rubber. In one possible embodiment, the facing member 12 is made from thermal plastic olefin (TPO). However, it should be appreciated that other materials may be utilized.

The resilient reinforcing element 14 may be generally described as including a mounting base section 16 and a depending support section 18. As best illustrated in FIG. 2, a mounting bracket 20 may be utilized to secure the mounting base section 16 to a frame cross member or bumper 22 by fasteners 23, welding or other appropriate means.

In the illustrated embodiment, the resilient reinforcing element 14 comprises a substantially continuous loop formed from a spring steel wire such as type 302 stainless steel wire having a diameter of between 0.014 and 0.620 inches (0.36 mm-15.75 mm).

Figure 2:
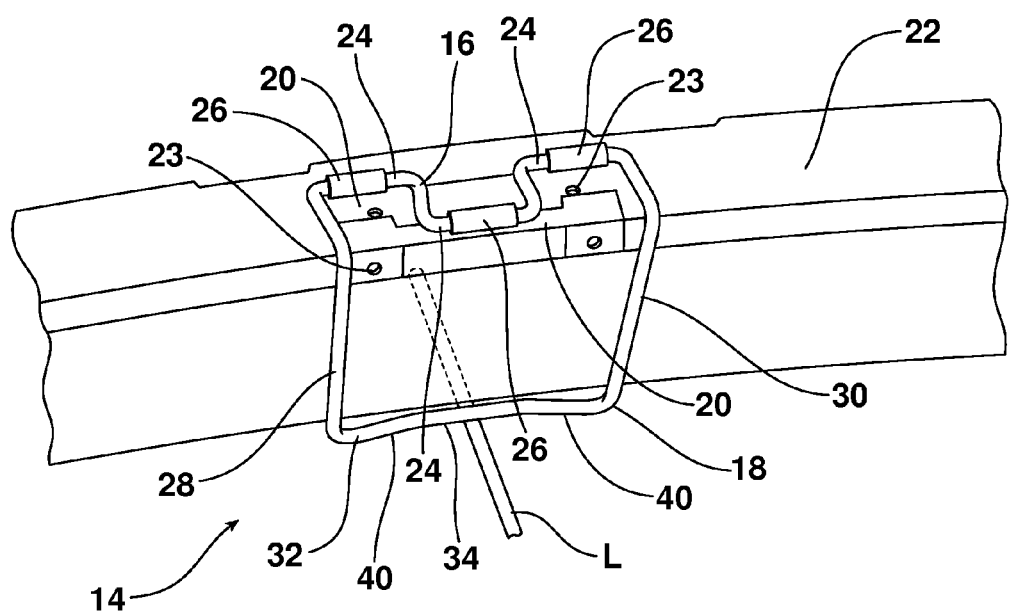
FIG. 2 is a detailed, rear perspective view illustrating the mounting of the resilient reinforcing element of the facing assembly to the cross member of the frame which supports the front bumper.

As best illustrated in FIG. 2, the mounting base section 16 comprises a serpentine structure including three segments 24 that are captured in cooperating channels 26 of the mounting bracket 20. The depending support section 18 includes a first arm 28 and a second arm 30 that depend from the mounting base section 16 and a cross member section or segment 32 that connects the first and second arms at the bottom of the reinforcing element 14.

Figure 4A:
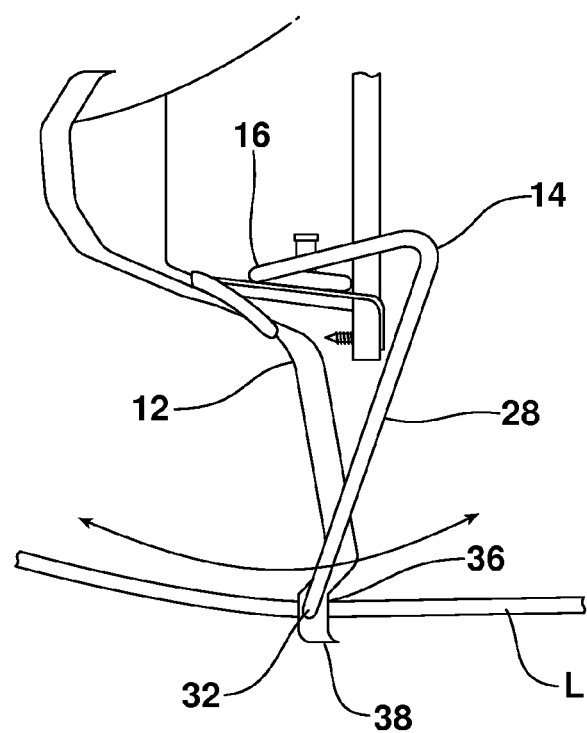
FIG. 4a is a schematic illustration showing the channel formed in the resilient reinforcing element which functions as a towing cable guide to protect the resilient facing member during towing wherein the assembly is in the home position.
Figure 4B:
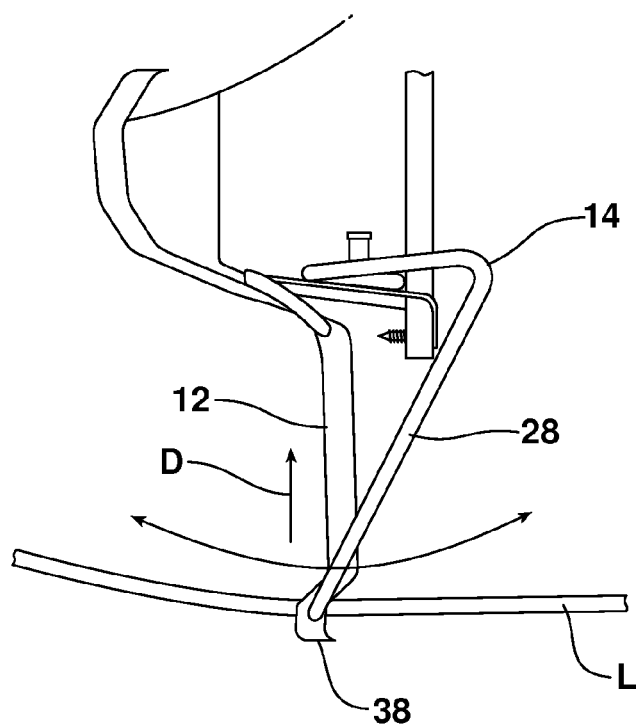
FIG. 4b is a view similar to FIG. 4a but showing how (a) the resilient facing member and supporting resilient reinforcing element flex slightly during towing and (b) how the reinforcing element protects the facing member from damage.

As best illustrated in FIGS. 2, 4a and 4b, the cross member 32 includes a towing cable guide in the form of a channel 34 that is adapted to receive, hold and guide a towing cable C when the vehicle V is towed in a manner that will be described in greater detail below.

Figure 3A:
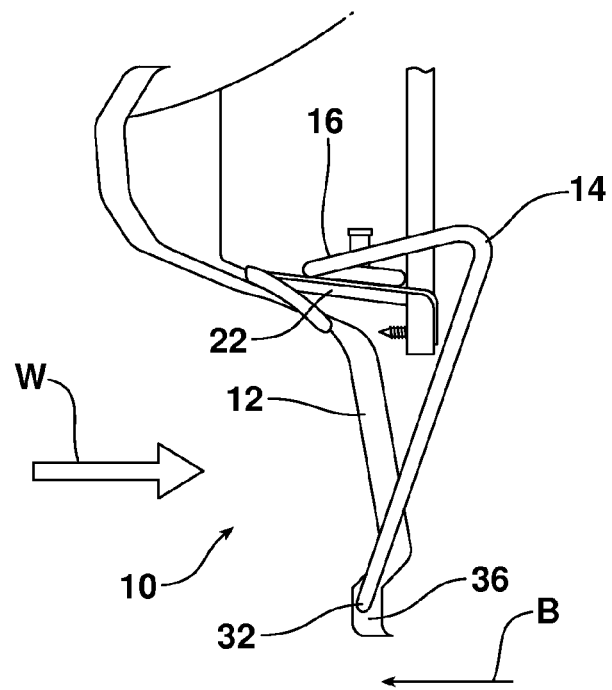
FIG. 3a is a schematic illustration showing the resilient facing member engaged and supported in the home position by the resilient reinforcing element.

Reference is now made to FIG. 3a illustrating the resilient facing member 12 and resilient reinforcing element 14 in the home position. As should be appreciated, the resilient reinforcing element 14 and, more specifically, the channel portion or cross member 32 of the element, engages in a groove 36 in the rear face of the resilient facing member 12 and thereby effectively supports the resilient facing member in the home position against wind forces (note action arrow W) experienced during vehicle operation so as to provide desired aerodynamics at speed. Advantageously, it should be appreciated that the reinforcing element 14 provides added strength to the resilient facing member 12 and, more specifically, the necessary rigidity to remain in the home position against these wind forces. As a consequence of that support, the resilient facing member 12 may be made from less rigid and more flexible material as it no longer must be self-supporting against this wind load.

Figure 3B:
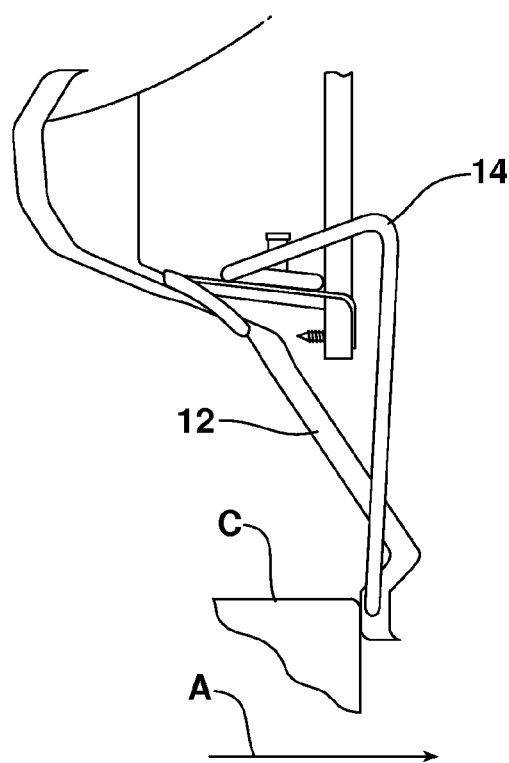
FIG. 3b is a schematic illustration showing how the resilient facing member and resilient reinforcing element flex to provide clearance when in contact with an obstruction.

As illustrated in FIG. 3b, when the facing assembly 10 is contacted by an obstruction such as the curb C, the resilient facing member 12 and resilient reinforcing element 14 flex rearwardly (note action arrow A) to provide clearance to prevent or minimize any damage from the contact with the curb/obstacle C. Here it should be appreciated that since the resilient facing member 12 is made from less rigid material than typical prior art facing members, it has greater flexibility and impact resistance and, therefore, is less likely to be significantly damaged by such contact.

Once the obstruction has been cleared, such as by backing the vehicle V away from the curb C, the resilient facing member 12 and resilient reinforcing element 14 both spring back into the home position illustrated in FIG. 3a (note action arrow B).

Reference is now made to FIGS. 2, 4a and 4b which illustrate in detail the towing cable guide feature that protects the facing assembly 10 and, more particularly, the resilient facing member 12, from damage that might otherwise be caused by a wench line or towing cable L. More specifically, as noted above, the cross member 32 includes a slight recess or channel 34 that is provided adjacent and immediately behind a lowermost edge 38 of the resilient facing member 12. In this position the channel 34 is visually hidden behind the resilient facing member 12 but is still able to protect that resilient facing member from potential damage such as when a wench line or cable L is connected to the frame of the vehicle V at a point (not shown) rearward of the facing assembly 10. When such a cable L is utilized to tow the vehicle V up an inclined flatbed of a wrecker or towing vehicle, the cable L is drawn upwardly toward a wench at the top of the flatbed (note upward angle of cable L). In this situation, the cable L is supported in the channel 34 of the cross member 32 which has sufficient rigidity and strength in the vertical direction (note action arrow D) to protect the resilient facing member 12 from potential damage from the cable. At the same time the sides 40 of the channel 34 help to guide and maintain the cable L in the channel so as to prevent it from slipping off the reinforcing element 14 and damaging the facing member 12.

In summary, the facing assembly 10 described herein provides a number of benefits and advantages that greatly serve to protect the cosmetic features of the resilient facing member 12. More specifically, the resilient reinforcing element 14 performs two very important functions. First it provides sufficient rigidity in the horizontal direction to support the resilient facing member 12 in its home position so as to provide the desired aerodynamics at speed which increases the stability and fuel economy of the vehicle. At the same time, this is done while having the necessary flexibility to allow the resilient facing member 12 and resilient reinforcing element 14 to flex when contacted by an obstruction C and thereby provide the necessary clearance to minimize any possible damage before springing back into the home position once clear of the obstruction. Advantageously, because the resilient reinforcing element 14 provides support and reinforcement to the facing member 12 in the home position, it should be appreciated that the facing member 12 may be made from a more flexible and less rigid material which provides better impact resistance in the event of contact with an obstruction C thereby minimizing the potential for substantial damage when engaging a curb, driveway ramp or other object.

In addition, it should be appreciated that the resilient reinforcing element 14 provides sufficient strength in the vertical direction to support and hold a towing cable L in channel 34 and effectively prevent crushing or cutting of the resilient facing member 12 by that cable during the towing or winching process. This is true even when the cable L is being pulled in an upward direction toward a winch at the top of an inclined flatbed tow truck.

The foregoing has been presented for purposes of illustration and description. It is not intended to be exhaustive or to limit the embodiments to the precise form disclosed. Obvious modifications and variations are possible in light of the above teachings. For example, while the illustrated embodiment incorporates a resilient reinforcing element 14 made from a stainless steel wire, it should be appreciated that the reinforcing element may be made from other appropriate material providing the necessary strength and resiliency required to function in the manner described above. All such modifications and variations are within the scope of the appended claims when interpreted in accordance with the breadth to which they are fairly, legally and equitably entitled.

What is claimed is:

1. A facing assembly for a motor vehicle, comprising:
a resilient facing member; and
a resilient reinforcing element engaging and supporting said resilient facing member wherein said facing member is supported in a home position against wind forces experienced during vehicle operation so as to provide desired aerodynamics at speed while said facing member and reinforcing element flex when contacted by an obstruction to provide clearance and then spring back into said home position once clear of the obstruction,
wherein said resilient reinforcing element is (a) formed from a substantially continuous spring steel wire and (b) includes a mounting base section and a depending support section.

2. The facing assembly of claim 1, wherein said resilient facing member is selected from a group of structures consisting of a front fascia, a valance panel and an air dam.

3. The facing assembly of claim 1, wherein said resilient reinforcing element includes a cross member having a channel to receive, hold and guide a towing cable and protect said resilient facing member from damage caused by the towing cable during towing.

4. The facing assembly of claim 3, further including at least one mounting bracket securing said mounting base section to a frame member or front bumper of said motor vehicle.

5. The facing assembly of claim 1, wherein said mounting base section is serpentine in shape.

6. The facing assembly of claim 5, further including at least one mounting bracket for securing said serpentine base member to a frame member or front bumper of the motor vehicle.

7. The facing assembly of claim 6, wherein said serpentine base member includes three segments and said mounting bracket includes three cooperating channels that capture and hold the three segments of the serpentine base member.

8. The facing assembly of claim 7, wherein said frame member is a frame cross member upon which a front bumper is mounted.

9. The facing assembly of claim 1, wherein said depending support section includes a first arm and a second arm depending from said mounting base section and a cross member connecting said first and second arms, said cross member including a channel to receive, hold and guide a towing cable and protect said resilient facing member from damage caused by the towing cable during towing.

10. The facing assembly of claim 1, wherein said resilient reinforcing element includes a channel to receive, hold and guide a towing cable and protect said resilient facing member from damage caused by the towing cable during towing.

11. The facing assembly of claim 10, wherein said channel is provided adjacent and immediately behind a lowermost edge of said resilient facing member.

12. A facing assembly for a motor vehicle, comprising:
a resilient facing member;
a resilient reinforcing element backing said resilient facing member, said resilient reinforcing element including a channel adjacent and immediately behind a lowermost edge of said resilient facing member to receive, hold and guide a towing cable and protect said resilient facing member from damage caused by the towing cable during towing; and
a towing cable guide on said resilient reinforcing element.

13. A method of reinforcing a resilient facing member for a motor vehicle, comprising:
engaging and supporting said resilient facing member with a resilient reinforcing element whereby said facing member is supported in a home position against wind forces experienced during vehicle operation so as to provide desired aerodynamics at speed while said facing member and reinforcing element flex when contacted by an obstruction to provide clearance and then spring back into said home position once clear of the obstruction; and
providing a channel adjacent and immediately behind a lowermost edge of said resilient facing member in said reinforcing element to receive, hold and guide a towing cable and protect said resilient facing member from damage caused by the towing cable during towing.

* * * * *